United States Patent
Wu et al.

(10) Patent No.: US 12,242,010 B2
(45) Date of Patent: Mar. 4, 2025

(54) HYDROPHONE GAIN DESIGN FOR ARRAY NOISE TOOL

(71) Applicant: Halliburton Energy Services, Inc., Houston, TX (US)

(72) Inventors: Xiang Wu, Singapore (SG); Yao Ge, Singapore (SG); Yadong Wang, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 349 days.

(21) Appl. No.: 17/885,347

(22) Filed: Aug. 10, 2022

(65) Prior Publication Data

US 2023/0314647 A1    Oct. 5, 2023

Related U.S. Application Data

(60) Provisional application No. 63/324,938, filed on Mar. 29, 2022.

(51) Int. Cl.
*G01V 1/46* (2006.01)
*G01V 1/18* (2006.01)

(52) U.S. Cl.
CPC ............... *G01V 1/46* (2013.01); *G01V 1/186* (2013.01); *G01V 2210/123* (2013.01)

(58) Field of Classification Search
CPC ..... G01V 1/46; G01V 1/186; G01V 2210/123
See application file for complete search history.

(56) References Cited

U.S. PATENT DOCUMENTS

| | | |
|---|---|---|
| 2014/0028459 A1 | 1/2014 | Solomon |
| 2014/0169127 A1* | 6/2014 | Orban ................. G01V 1/40 367/25 |
| 2017/0184751 A1 | 6/2017 | Ang et al. |
| 2017/0299751 A1 | 10/2017 | Chang et al. |
| 2018/0021815 A1 | 1/2018 | Jin et al. |
| 2018/0176679 A1 | 6/2018 | Lu et al. |
| 2018/0258756 A1 | 9/2018 | Nguyen et al. |
| 2018/0274359 A1 | 9/2018 | Bondarenko et al. |
| 2020/0003924 A1 | 1/2020 | Jin et al. |
| 2021/0103069 A1 | 4/2021 | Jin et al. |
| 2021/0108510 A1* | 4/2021 | Ge ................. G01N 29/4472 |
| 2021/0109243 A1 | 4/2021 | Ge et al. |
| 2021/0199829 A1 | 7/2021 | Wu et al. |
| 2021/0222551 A1 | 7/2021 | Jin et al. |
| 2021/0231008 A1 | 7/2021 | Stark et al. |
| 2021/0238989 A1 | 8/2021 | Ang et al. |
| 2021/0349229 A1 | 11/2021 | Wang et al. |
| 2021/0396126 A1 | 12/2021 | Wang et al. |

(Continued)

OTHER PUBLICATIONS

International Search Report and Written Opinion for PCT/US2022/041736 dated Dec. 28, 2022.

*Primary Examiner* — Krystine E Breier
(74) *Attorney, Agent, or Firm* — John Wustenberg; C. Tumey Law Group PLLC

(57) ABSTRACT

A system for leak detection. The system may comprise an acoustic logging tool that includes a hydrophone array with a plurality of hydrophones. The system may further include an information handling system communicatively connected to the acoustic logging tool and wherein the information handling system chooses three or more hydrophones from the plurality of hydrophones to operate during measurement operations.

18 Claims, 6 Drawing Sheets

(56) References Cited

U.S. PATENT DOCUMENTS

2021/0396900 A1 12/2021 Wang et al.
2021/0404320 A1 12/2021 Jin et al.
2022/0136385 A1 5/2022 Wang et al.

\* cited by examiner

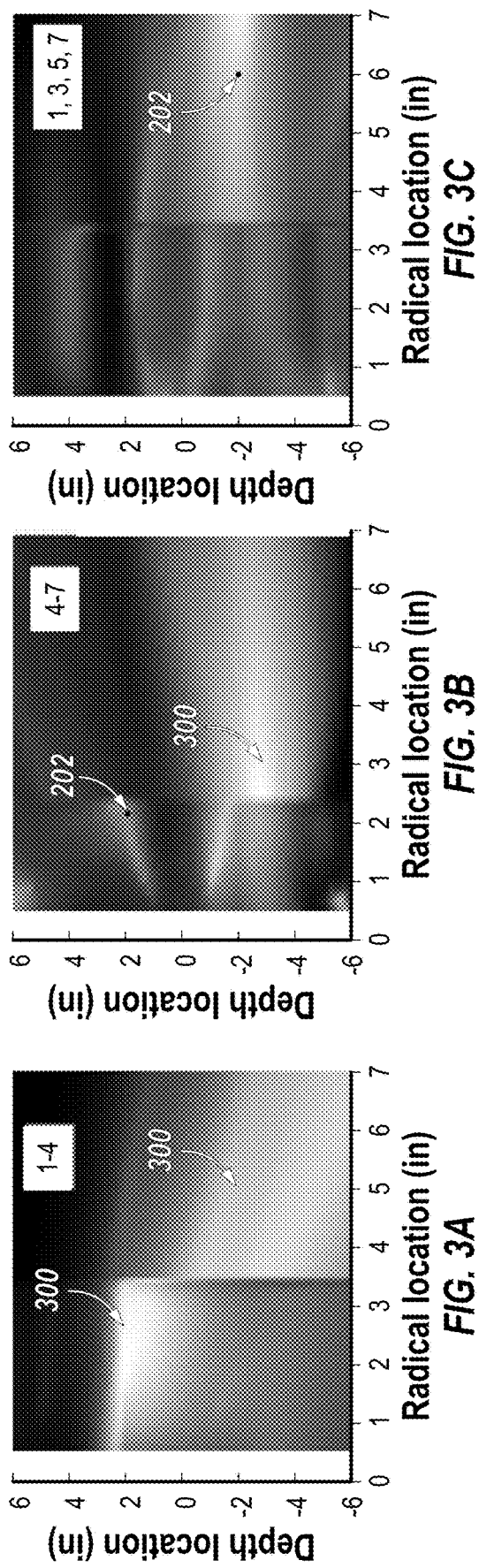
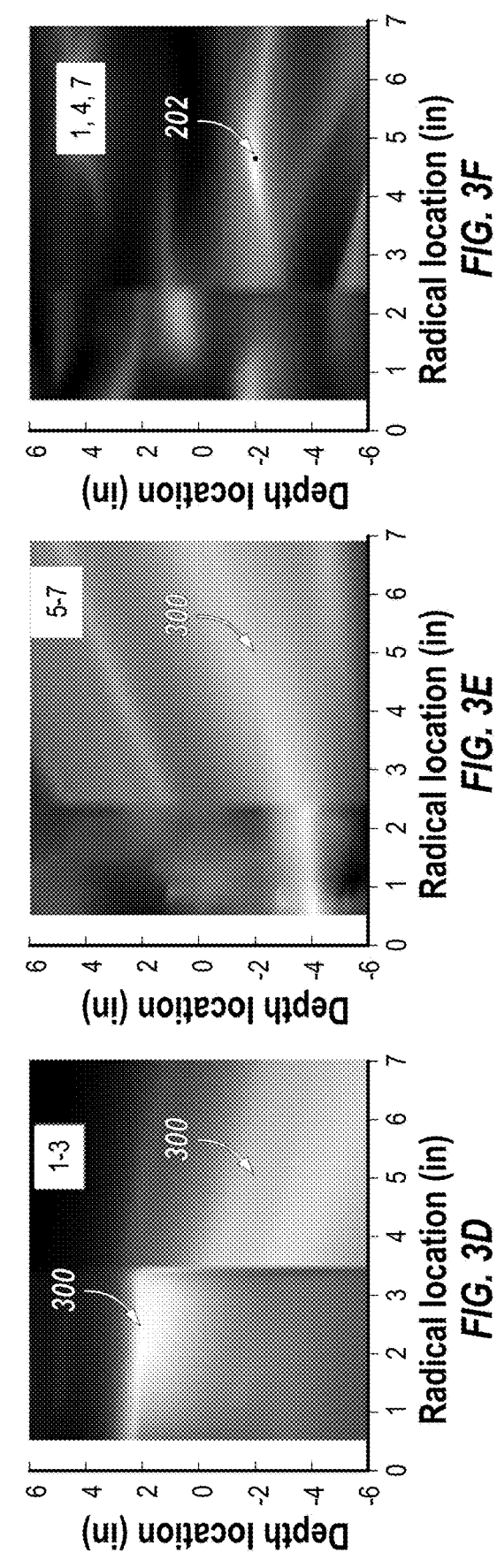

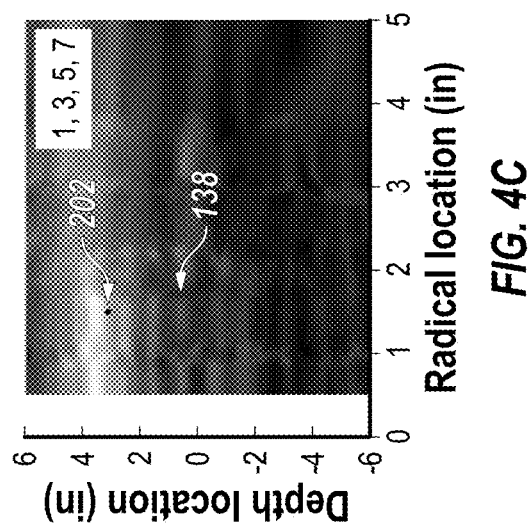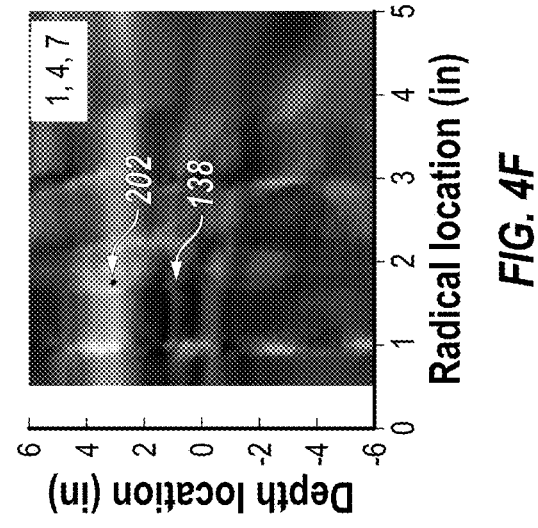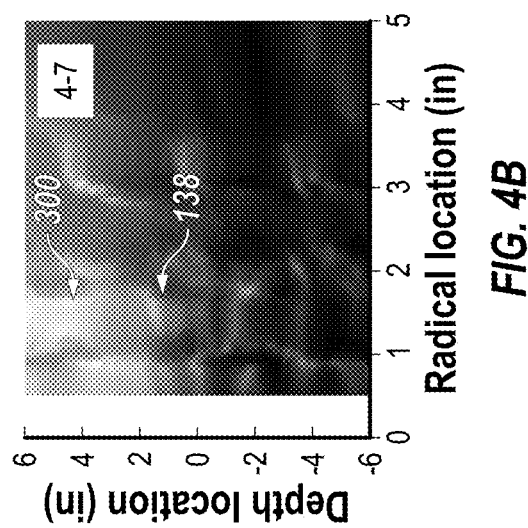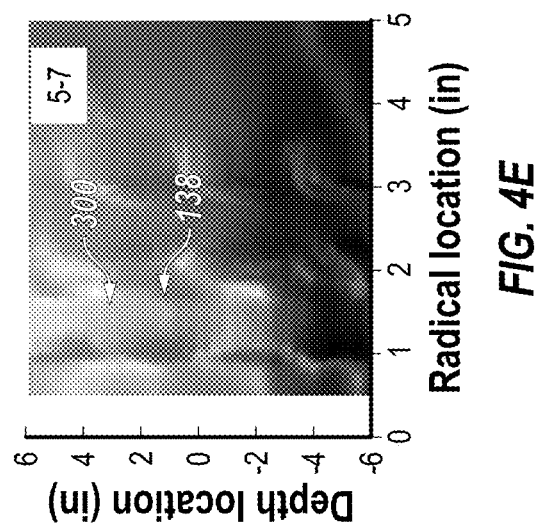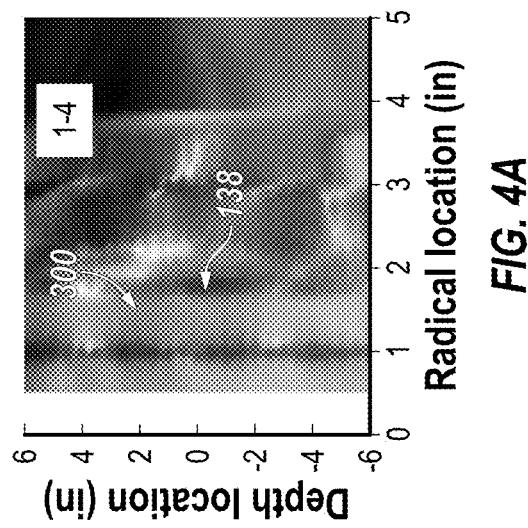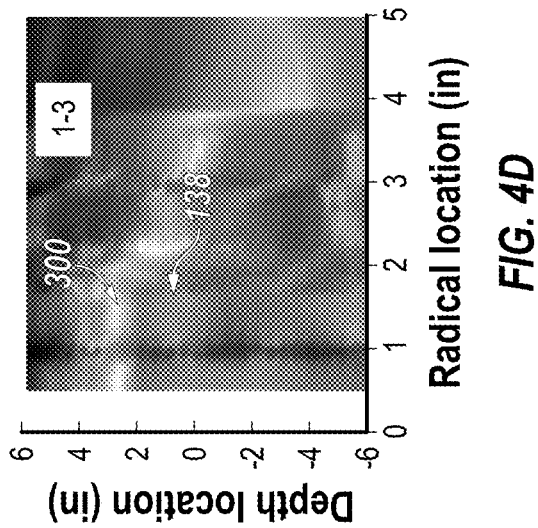

HYDROPHONE GAIN DESIGN FOR ARRAY NOISE TOOL

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

A growing concern in the life of an oil or gas well is the pressure buildup in its annuli. Pressure buildup may fatigue conduits within the annuli. Eventually, the conduit may fail and lead to a leak, in which fluid from outside the conduit flows to the inside of the conduit. This may lead to the recovery of undesirable fluids, additional corrosion, and/or catastrophic failure of multiple conduits. The first challenge for a petroleum engineer is to identify the source of the leak to enable design of an effective remedial activity. Identification of the source of pressure communication between well tubing-casing and casing-casing annuli presents an enormous challenge to petroleum engineers.

There are many methods to identify the source of leaks in a well by capturing acoustic noise with hydrophones. Currently, when utilizing hydrophones, a reoccurring problem is the saturation of either high gain channels or low gain channels that are both disposed on an acoustic logging tool. For example, for high amplitude leak noise, a low-gain hydrophone is able to record and measure this noise, however, high-gain hydrophones disposed on the acoustic logging tool become saturated. The opposite is true for low amplitude leak noise. High-gain hydrophones are able to record low frequency leak noise, but low-gain channels disposed on the acoustic logging tool become saturated.

BRIEF DESCRIPTION OF THE DRAWINGS

These drawings illustrate certain aspects of some examples of the present disclosure and should not be used to limit or define the disclosure.

FIGS. 3A-3F are graphs of laboratory data showing the location of a leak;

FIGS. 4A-4F are graphs of field data showing the location of the leak;

DETAILED DESCRIPTION

This disclosure may generally relate to methods and systems for capturing and recording both a high leak noise and a low leak noise using an acoustic logging tool. To record both the high leak noise and the low leak noise, a hydrophone array of at least three hydrophones may be utilize for beamforming. A two-level gain configuration is designed to have selected channels (minimum three hydrophones in a group) with high gain and other channels with low gain. A two-level gain configuration is defined as at least one low gain channel on a hydrophone and at least one high gain channel on a second hydrophone disposed on the acoustic logging tool. In examples, there may be a plurality of low gain channels and a plurality of high gain channels. The two groups (high and low gain channels) are designed to create a larger aperture for both groups, which may optimize beamforming results.

Figure 1:
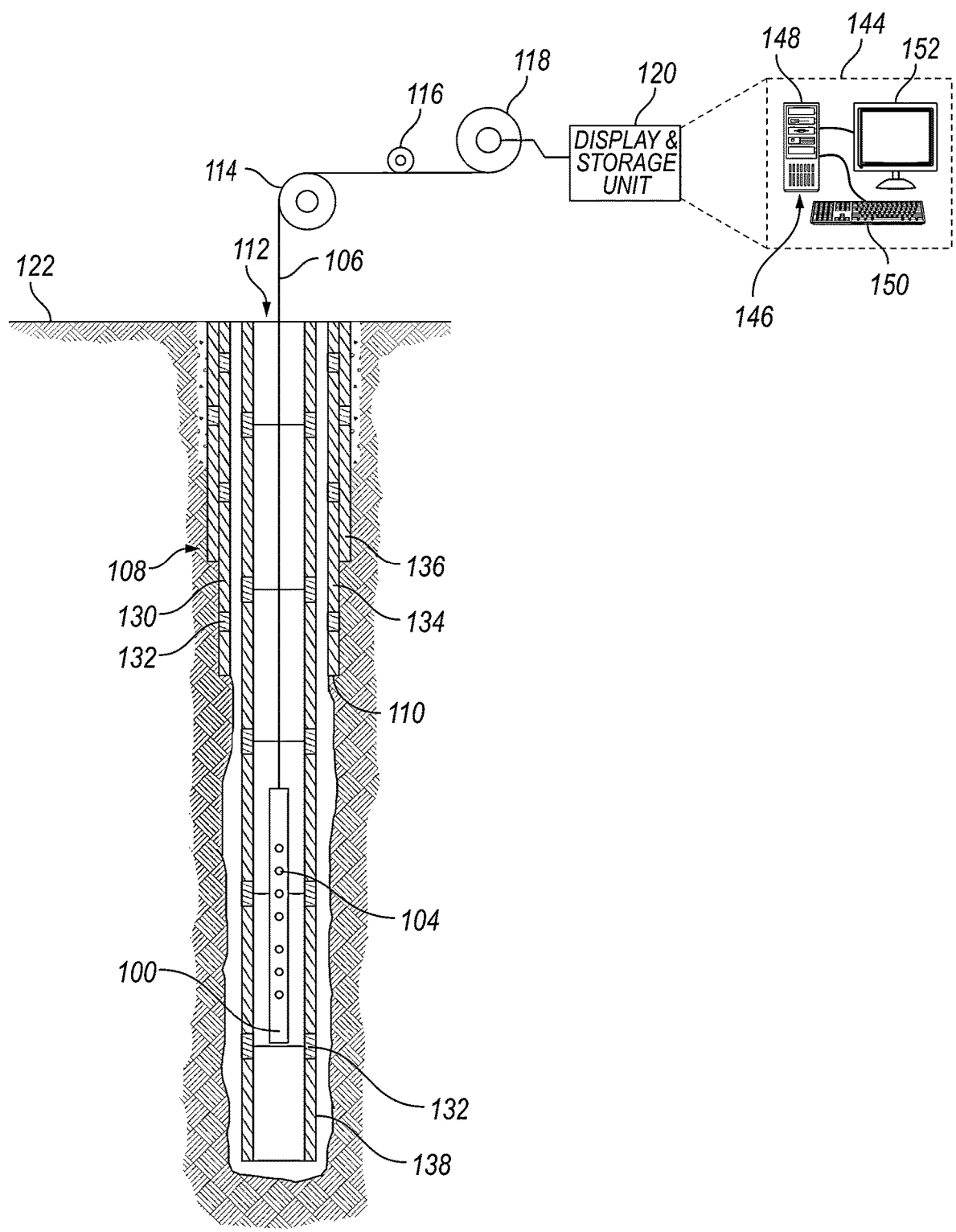
FIG. 1 illustrates a system including an acoustic logging tool.

FIG. 1 illustrates an operating environment for an acoustic logging tool 100 as disclosed herein in accordance with particular embodiments. Acoustic logging tool 100 may comprise a hydrophone 104. In examples, there may be any number of hydrophones 104, which may be disposed on acoustic logging tool 100. Acoustic logging tool 100 may be operatively coupled to a conveyance 106 (e.g., wireline, slickline, coiled tubing, pipe, downhole tractor, and/or the like) which may provide mechanical suspension, as well as electrical connectivity, for acoustic logging tool 100. Conveyance 106 and acoustic logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by acoustic logging tool 100 may be stored on memory and then processed by display and storage unit 120 after recovery of acoustic logging tool 100 from wellbore 110. Alternatively, signals recorded by acoustic logging tool 100 may be conducted to display and storage unit 120 by way of conveyance 106. Display and storage unit 120 may process the signals, and the information contained therein may be displayed for an operator to observe and stored for future processing and reference. Alternatively, signals may be processed downhole prior to receipt by display and storage unit 120 or both downhole and at surface 122, for example, by display and storage unit 120. Display and storage unit 120 may also contain an apparatus for supplying control signals and power to acoustic logging tool 100. Typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. Acoustic logging tool 100 may be dimensioned so that it may be lowered into the wellbore 110 through pipe string 138, thus avoiding the difficulty and expense associated with pulling pipe string 138 out of wellbore 110.

In logging systems, such as, for example, logging systems utilizing the acoustic logging tool 100, a digital telemetry system may be employed, wherein an electrical circuit may be used to both supply power to acoustic logging tool 100 and to transfer data between display and storage unit 120 and acoustic logging tool 100. A DC voltage may be provided to acoustic logging tool 100 by a power supply located above ground level, and data may be coupled to the DC power conductor by a baseband current pulse system. Alternatively, acoustic logging tool 100 may be powered by batteries located within the downhole tool assembly, and/or the data provided by acoustic logging tool 100 may be stored within the downhole tool assembly, rather than transmitted to the surface during logging (corrosion detection).

As illustrated, one or more hydrophones 104 may be positioned on the acoustic logging tool 100. It should be understood that the configuration of acoustic logging tool 100 shown on FIG. 1 is merely illustrative and other configurations of acoustic logging tool 100 may be used with the present techniques. Hydrophone 104 may include any suitable acoustic receiver suitable for use downhole, including piezoelectric elements that may convert acoustic waves into an electric signal or hydrophones. Additionally, hydrophone 104 may be able to record any waves generated by leakage or other flow event inside and/or outside of the borehole. In examples, hydrophone 104 may be disposed at any suitable location on acoustic logging tool 100. For example, hydrophones 104 may be disposed along the outer edge of acoustic logging tool 100 or within acoustic logging tool 100. Additionally, hydrophones 104 may be stacked along the longitudinal axis of acoustic logging tool 100 and/or one or more hydrophones 104 may be disposed circumferentially in a plane perpendicular to the longitudinal axis of acoustic logging tool 100.

Referring back to FIG. 1, the recordation of signals by hydrophones 104 may be controlled by display and storage unit 120, which may include an information handling system 144. As illustrated, the information handling system 144 may be a component of the display and storage unit 120. Alternatively, the information handling system 144 may be a component of acoustic logging tool 100. An information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output devices) 152 provide a user interface that enables an operator to interact with acoustic logging tool 100 and/or software executed by processing unit 146. For example, information handling, system 144 may enable an operator to select analysis options, view collected log data, view analysis results, and/or perform other tasks.

Figure 2:
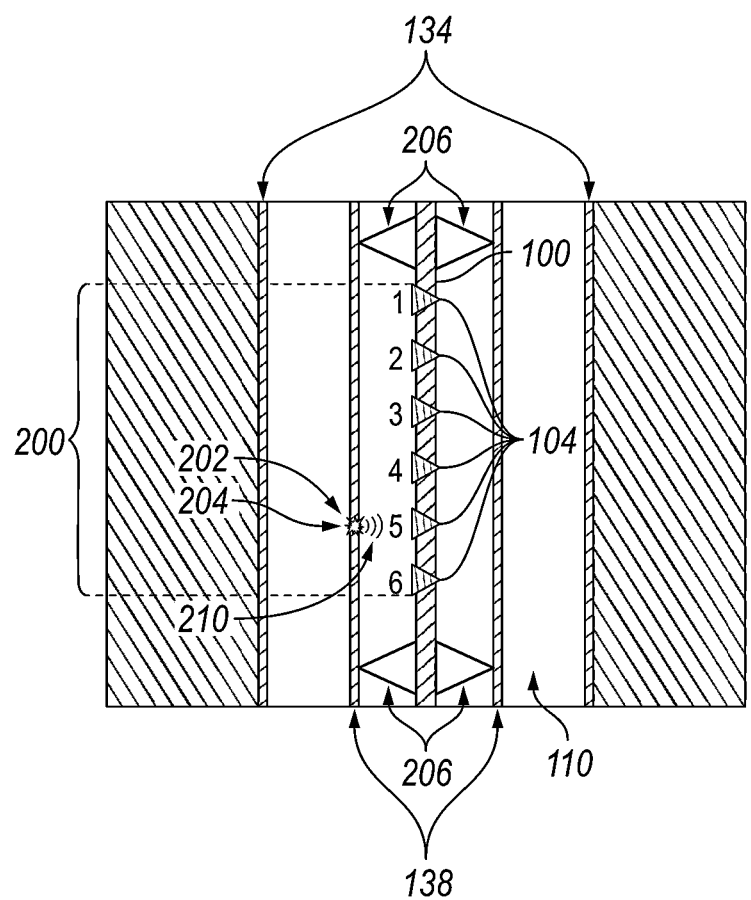
FIG. 2 illustrates an acoustic logging tool during measurement operations.

FIG. 2 illustrates acoustic logging tool 100 with a hydrophone array 200 in accordance with particular embodiments. Without limitation, there may be any number of hydrophones 104. As illustrated, the hydrophone array 200 includes a plurality of the hydrophones 104 arranged longitudinally along the acoustic logging tool 100. During measurement operations, acoustic logging tool 100 may detect the depth and radial location of leak 202 and/or flow of fluid 204 in wellbore 110. In examples, acoustic logging tool 100 may be deployed with one or more stabilizers 206 installed above or below acoustic logging tool 100. As illustrated in FIG. 2, and discussed above, acoustic logging tool 100 may be disposed in pipe string 138, which may be disposed in a first casing 134. During operations, each hydrophone 104 of hydrophone array 200 may sense and record any number of acoustic signals and/or vibrations continuously as acoustic logging tool 100 moves up or down wellbore 110 within pipe string 138. The recorded acoustic signals and/or vibrations may be formed into acoustic data. The acoustic data may be transmitted to information handling system 144 (e.g., referring to FIG. 1), which may process each recorded acoustic signal with a beamforming algorithm to identify the location of the acoustic source. Without limitation, information handling system 144 may be disposed at the surface or on acoustic logging tool 100. Still further, multiple information handling systems 144 may be utilized, where at least one information handling system 144 is disposed at surface and at least another information handling system 144 is disposed on acoustic logging tool 100, where every information handling system 144 is in communication with each other. In examples, the acoustic source may be a leak 202 caused by flow of fluid 204 in leak 202. Fluid 204 may be flowing from outside pipe string 138 and into pipe string 138, or vice versa. Likewise, fluid 204 may be moving from outside of first casing 134 and into first casing 134, or vice versa. This is true for any casing that may be outside of first casing 134. To properly process acoustic noise, beamforming may be used. Beamforming is a signal processing technique used in hydrophone array 200 for directional signal transmission or reception. This is achieved by combining waveforms by a phased array in such a way that signals at particular angles experience constructive interference while others experience destructive interference. Utilizing this concept, personnel may be able to determine the location of leak 202 and/or the source of acoustic noise.

With continued reference to FIG. 2, acoustic noise may be captured and recorded by hydrophones 104. Hydrophones 104 are commonly built with pre-amplifiers to increase the output voltage by a gain value. The gain value may be as understood as the gain value of the pre-amplifier connected with hydrophone 104. If there are other electronics built in with hydrophone 104, the gain values are considered. For example, if there are a pre-amplifier and a filter board, the gain value equals the pre-amplifier gain value multiplied by the filter board gain value. Hydrophones 104 with a high gain value (i.e., a high gain channel) may be sensitive and able to pick up low-amplitude acoustic noises. However, a hydrophone 104 with a high gain value may become saturated when there is a high-amplitude acoustic noise. With a low gain value, hydrophone 104 may be able to detect high-amplitude acoustic noises, but low-amplitude acoustic noises may be below the noise floor of hydrophone 104 and undetectable. To capture and record a range of noise amplitude levels (e.g., both high and low), hydrophone array 200 may be designed to have a selected number of hydrophones 104 designed with a high gain and the others with a low gain.

However, there is often a problem that the range of hydrophones 104 are not sufficient to cover both low leak noise and high leak noise. Generally, there is a threshold noise level below which acoustic noise is undetectable. The noise level is related to the electrical or baseline noise of a hydrophone 104. When electrical signal generated by the noise is below the baseline noise of hydrophone 104, the noise is undetectable.

The noise level is related to different gains a hydrophone 104 may be created for. As discussed below, systems and methods may utilize a high gain and a low gain hydrophone 104 for measurement operations. Low-gain hydrophones 104 may not be able to detect low leak noise (because it falls below its low threshold). Similarly, high-gain hydrophones 104 may not be able to detect high leak noise (because the noise level is above its high threshold). For high leak noise, there is a maximum threshold for an electric signal in which hydrophone 104 may be designed. If the electrical signal is above the maximum threshold, the signal will saturate hydrophone 104. This may effectively place a high ceiling on hydrophone 104 and prevent it from recording higher acoustic signal amplitudes.

For high leak noise, low-gain hydrophones 104 (i.e., a low gain channel) are able to capture and record high leak noise, but high gain channels are saturated. For low leak noise, high-gain hydrophones 104 are able to capture and record low leak noise, but low-gain hydrophones 104 cannot.

Additionally, there me be times during measurement operations in which only a selected number of hydrophones 104 may be in working condition. In order to optimize beamforming results during measurement operations, a method of individual selecting hydrophones 104 at any given time may be performed. Optimization for this matter is the best selection of hydrophones 104 to produce the clearest images and measurements.

For example, the method may be performed with at least three viable hydrophones 104. During measurement operations, at least three hydrophones 104 may be utilized for beamforming and an aperture of hydrophone array 200 may be as large at acoustic logging tool 100 (e.g., referring to FIG. 1) may allow for an optimized beamforming result. Generally, in examples, the number of hydrophones 104 and their spacings are fixed. The selection of hydrophone 104 may be 1, 2, 3 low gain and 4, 5, 6 high gain. In this example, the aperture is reduced as the spacing only has two hydrophones 104. In another example, the selection of hydrophones 104 are 1, 3, 5 low gain and 2, 4, 6 high gain. The aperture in this case has a spacing of four hydrophones 104. In this example, a two-level gain configuration for hydrophone array 200 disposed on acoustic logging tool 100 is designed to a first group of channels with high gain and another group of channels with low gain. The two groups (high and low gain channels) are designed to be spaced out, or not adjacent to each other, to create a larger aperture for both groups, which may give optimal beamforming results. In examples, hydrophones 104 in a group (low or high gain) may be adjacent to each other. This may be considered as minimum length of separation, which is no separation between hydrophones 104. Thus, hydrophones 104 may be separated from each other in other examples by about one inch (about 2.5 centimeters), about six inches (about 15 centimeters), about a foot (about 0.3 meters), about one foot to six feet (about 0.3 meters to about 2 meters), or about five feet to about ten feet (about 1.5 meters to about 3 meters). A channel represents a single hydrophone 104. In examples, the high gain channel and low gain channels may be adjacent to each other. During measurement operations, chosen hydrophones 104 from hydrophone array 200 are selected by personnel utilizing information handling system 144, which is communicatively coupled to acoustic logging tool 100 (e.g., referring to FIG. 1).

Generally, there may be about seven hydrophones 104 in hydrophone array 200. FIGS. 3A-3F shows different beamforming results with different hydrophone selections based on laboratory test data. In these tests, hydrophone array 200 was located in the center of first casing 134 (with 3.5-inch radius), and there is a leak 202 outside pipe string 138. FIGS. 3A and 3B illustrate when four consecutive hydrophones 104 are selected (e.g., 1-4 or 4-7), the aperture is not maximized, and the beamforming result shows large artifacts 300 both inside and outside first casing 134. For this disclosure, maximized is defined as largest possible distance between a topmost hydrophone 104 and bottommost hydrophone 104 in a group (either high gain or low gain). The largest possible distance is generally length of the entire hydrophone array 200 minus the distance between two adjacent hydrophones 104. Additionally, large artifacts 300 is identified by a lighter color, which may indicate possible location of leak 202 (e.g., referring to FIG. 2). In FIGS. 3A and 3B, a possible leak 202 is identified by large light-colored area near (2,2) in and (5, −3) in. The potential area for leak 202 is not focused, thus the area is considered a large artifact 300.

FIG. 3C show when hydrophones 104 are spaced out to cover a large aperture (e.g., 1, 3, 5, 7), the beamforming result shows leak 202 outside first casing 134. As shown in FIG. 3C, a lighter color indicates possible location of leak 202. In FIG. 3C, as the lighter color is focused, a leak 202 is presumed to be near (6, −2) in. Similarly, with three hydrophones 104 selected, as illustrated in FIGS. 3D and 3E, large artifacts 300 are observed when hydrophones 104 are closely together (e.g., 1-3 or 5-7). In FIGS. 3D and 3E, the lighter area indicating a location of leak 202 is not focused. In FIG. 3D, there are large light color area near (2,2) and (5, −4). In FIG. 3E, the light color area is near depth location −4. In FIGS. 3D and 3E, the location of leak 202 cannot be identified, thus it is identified as large artifacts 300. In FIG. 4F, the light color area is focused at (5, −2), indicating a possible location of leak 202. When hydrophones 104, as illustrated in FIG. 3F, are spaced out (e.g., 1, 4, 7), leak 202 outside first casing 134 may be shown. Hence, hydrophone 1, 3, 5, 7 (e.g., FIG. 3C) and hydrophone 1, 4, 7 (e.g., FIG. 3F) may be the best configurations when utilizing four hydrophones 104 and/or three hydrophones 104, respectively. FIGS. 4A-4F is actual field data that verifies the lab data seen in FIGS. 3A-3F. At this depth, there is a leak 202 at 1.75-inch radially. When hydrophones 104 are closely together (e.g., referring to FIGS. 4A, 4B, 4D, and 4E), the light color areas are spread out and not focused, large artifacts 300. When the aperture is maximized (FIGS. 4C and 4F), a light area is focuses an indicates a leak 202. This is located at 4 in depth within pipe staring 138 (e.g., referring to FIG. 2). The radius of pipe string 138 is 1.75 in. When hydrophones 104 are spaced out (e.g., FIGS. 4C and 4F) to maximize the aperture, the beamforming result is the best.

Figure 5A:
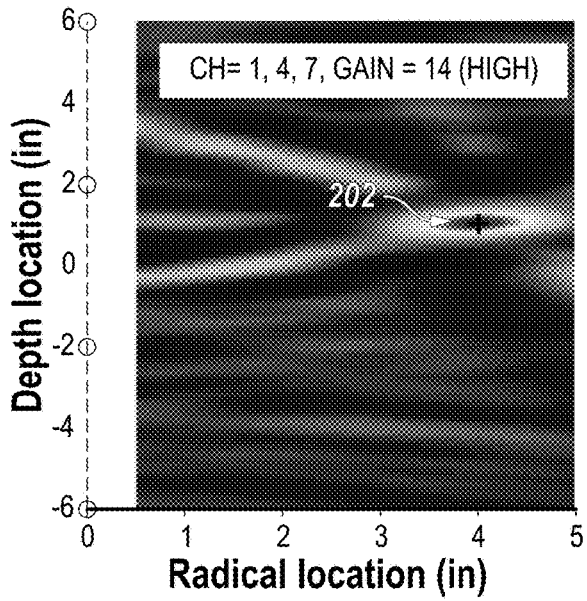
FIGS. 5A & 5B are graphs showing low leak noise with a signal-noise-ratio (SNR) of 0.002:1.
Figure 5B:
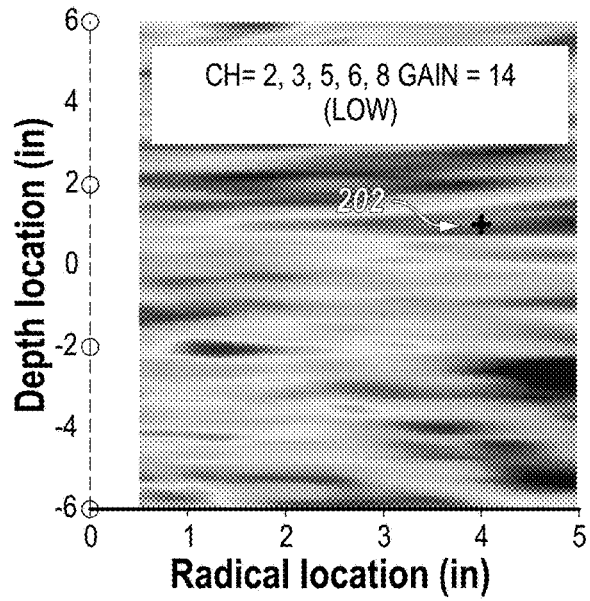
Figure 5C:
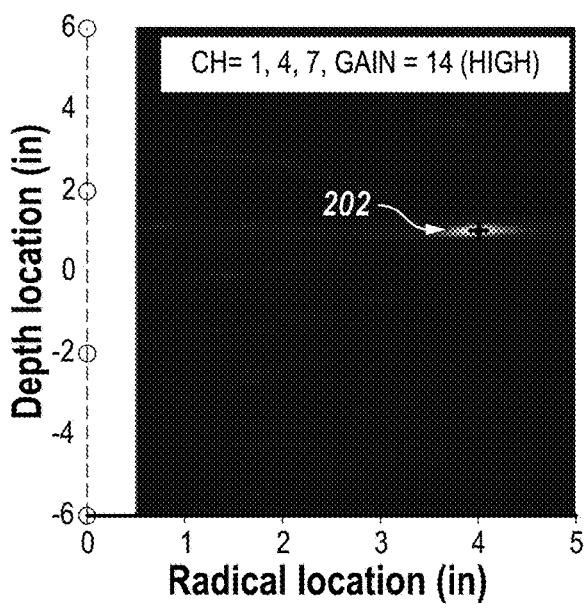
FIGS. 5C & 5D are graphs showing high leak noise with a SNR of 10:1.
Figure 5D:
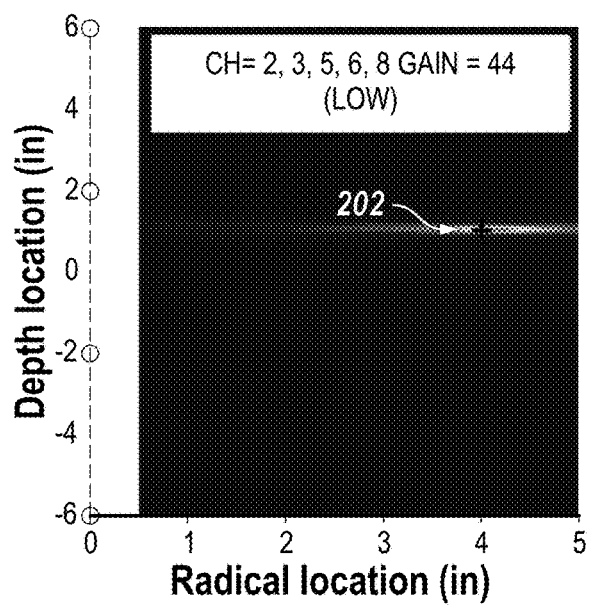
Figure 6A:
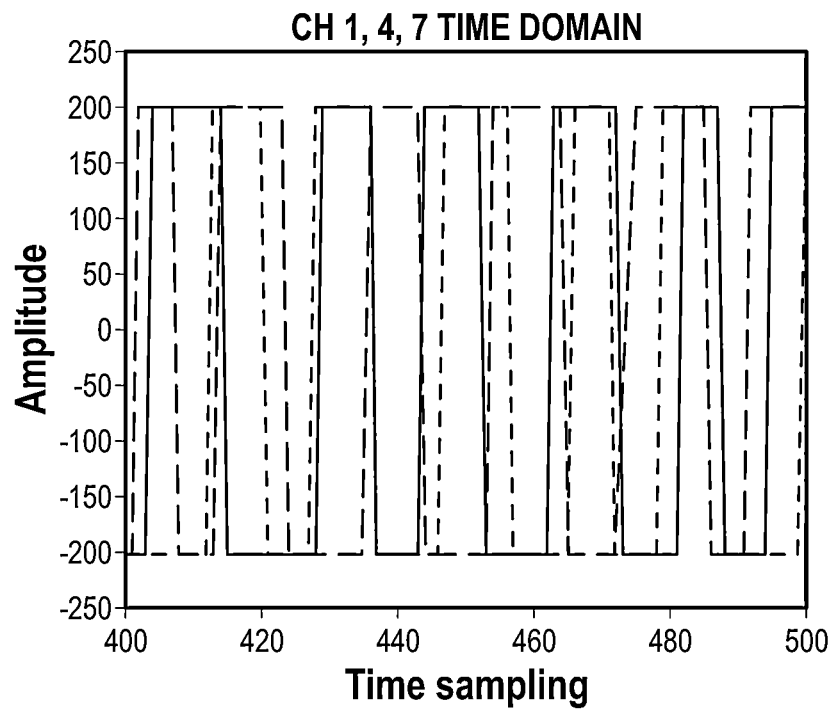
FIG. 6A is a graph of saturation in the noise domain.
Figure 6B:
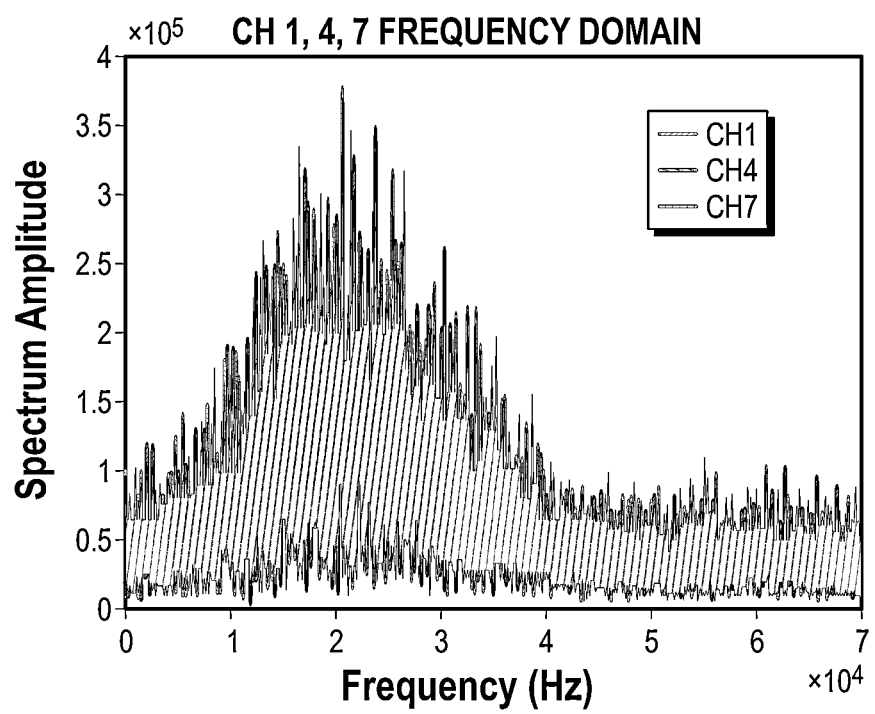
FIG. 6B is a graph of saturation in the frequency domain.

In other examples, a hydrophone gain design for an eight-hydrophone array 200 (e.g., referring to FIG. 2) is shown in FIGS. 5A-5D. The eight-hydrophone array 200 has channels 1, 4, and 7 with high gain and channels 2, 3, 4, 5, 8 with low gain. The beamforming results are generated from synthetic data with the true leak location at (4,1) inch. FIGS. 5A and 5B are generated with a signal-to-noise ratio of 0.002:1. With a low noise level, only channels designed for high gain produce reliable measurements. Thus, only the beamforming map generated with channels 1, 4, and 7 shows the correct location of leak 202. FIGS. 5C and 5D are generated with a signal-to-noise ratio of 10:1. With a high signal amplitude, channels 1, 4, and 7 are saturated while channels 2, 3, 5, 6, and 8 produce reliable measurements. Saturation is illustrated in FIG. 6A on a time domain and FIG. 6B in a frequency domain. Beamforming results show that both groups of hydrophones 104 show the correct location of leak 202. This is because although channels 1, 4, and 7 are saturated, and the signal amplitude is truncated, the phase information is preserved (e.g., as illustrated in FIGS. 6A and 6B). The beamforming algorithm only uses phase information. However, these hydrophones 104 do not show the correct signal amplitude and the two-gain design is still necessary.

Improvements over the current technology are found in that compared to a single gain design, the proposed two-gain design allows the beamforming to perform at lower or higher noise level. The solution to maximize hydrophone aperture helps to optimize beamforming result at lower or higher noise level when not all hydrophones are viable and/or working. The systems and methods may include any of the various features disclosed herein, including one or more of the following statements.

Statement 1: A system for leak detection may comprise an acoustic logging tool. The acoustic logging tool may comprise a hydrophone array with a first group of hydrophones and a second group of hydrophones. The system may further comprise an information handling system communicatively connected to the acoustic logging tool and wherein the information handling system chooses three or more hydrophones from the first group of hydrophones and the second group of hydrophones.

Statement 2. The system of statement 1, wherein the first group of hydrophones are low gain hydrophones.

Statement 3. The system of statement 2, wherein the low gain hydrophones are saturated from high amplitude acoustic noise.

Statement 4. The system of statement 2, wherein the second group of hydrophones are high gain hydrophones.

Statement 5. The system of statement 4, wherein the high gain hydrophones do not sense low amplitude acoustic noise.

Statement 6. The system of statement 4, wherein at least one high gain hydrophone and at least one low gain hydrophone are adjacent to each other.

Statement 7. The system of statement 4, wherein two or more high gain hydrophones are disposed adjacent to a low gain hydrophone.

Statement 8. The system of statement 4, wherein two or more low gain hydrophones are disposed adjacent to a high gain hydrophone.

Statement 9. The system of statement 4, wherein each of the low gain hydrophones are spaced apart from each other.

Statement 10. The system of statement 4, wherein each of the high gain hydrophones are spaced apart from each other.

Statement 11. A method for leak detection may comprise disposing an acoustic logging tool into a wellbore. The acoustic logging tool may comprise a hydrophone array with a first group of hydrophones and a second group of hydrophones. The method may further comprise selecting three or more hydrophones from the hydrophone array using an information handling system that is communicatively connected to the acoustic logging tool and performing measurements with the three or more hydrophones chosen from the hydrophone array.

Statement 12. The method of statement 11, wherein the first group of hydrophones are low gain hydrophones.

Statement 13. The method of statement 12, wherein the low gain hydrophones are saturated from high amplitude acoustic noise.

Statement 14. The method of statement 12, wherein the second group of hydrophones are high gain hydrophones.

Statement 15. The method of statement 14, wherein the high gain hydrophones do not sense low amplitude acoustic noise.

Statement 16. The method of statement 14, wherein at least one high gain hydrophone and at least one low gain hydrophone are adjacent to each other.

Statement 17. The method of statement 14, wherein two or more high gain hydrophones are disposed adjacent to a low gain hydrophone.

Statement 18. The method of statement 14, wherein two or more low gain hydrophones are disposed adjacent to a high gain hydrophone.

Statement 19. The method of statement 14, wherein each low gain hydrophone are spaced apart from each other.

Statement 20. The method of statement 14, wherein each high gain hydrophone are spaced apart from each other.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A system for leak detection comprising:
   an acoustic logging tool that comprises:
      a hydrophone array with a first group of hydrophones and a second group of hydrophones; and
   an information handling system communicatively connected to the acoustic logging tool and wherein the information handling system chooses three or more hydrophones from the first group of hydrophones and the second group of hydrophones, wherein the first group of hydrophones are low gain hydrophones.

2. The system of claim 1, wherein the high gain hydrophones are saturated from high amplitude acoustic noise.

3. The system of claim 1, wherein the second group of hydrophones are high gain hydrophones.

4. The system of claim 3, wherein the low gain hydrophones do not sense low amplitude acoustic noise.

5. The system of claim 3, wherein at least one high gain hydrophone and at least one low gain hydrophone are adjacent to each other.

6. The system of claim 3, wherein two or more high gain hydrophones are disposed adjacent to a low gain hydrophone.

7. The system of claim 3, wherein two or more low gain hydrophones are disposed adjacent to a high gain hydrophone.

8. The system of claim 3, wherein each of the low gain hydrophones are spaced apart from each other.

9. The system of claim 3, wherein each of the high gain hydrophones are spaced apart from each other.

10. A method for leak detection comprising:
    disposing an acoustic logging tool into a wellbore, wherein the acoustic logging tool comprises:
       a hydrophone array with a first group of hydrophones and a second group of hydrophones, wherein the second group of hydrophones are high gain hydrophones; and
    selecting three or more hydrophones from the hydrophone array using an information handling system that is communicatively connected to the acoustic logging tool; and
    performing measurements with the three or more hydrophones chosen from the hydrophone array.

11. The method of claim 10, wherein the first group of hydrophones are low gain hydrophones.

12. The method of claim 11, wherein the high gain hydrophones are saturated from high amplitude acoustic noise.

13. The method of claim 11, wherein the low gain hydrophones do not sense low amplitude acoustic noise.

14. The method of claim 11, wherein at least one high gain hydrophone and at least one low gain hydrophone are adjacent to each other.

15. The method of claim 11, wherein two or more high gain hydrophones are disposed adjacent to a low gain hydrophone.

16. The method of claim 11, wherein two or more low gain hydrophones are disposed adjacent to a high gain hydrophone.

17. The method of claim 11, wherein each low gain hydrophone are spaced apart from each other.

18. The method of claim 11, wherein each high gain hydrophone are spaced apart from each other.

* * * * *